No. 842,111. PATENTED JAN. 22, 1907.
H. A. PEDRICK & C. A. SMITH.
PIPE BENDING MACHINE.
APPLICATION FILED MAR. 1, 1906.

2 SHEETS—SHEET 1.

No. 842,111. PATENTED JAN. 22, 1907.
H. A. PEDRICK & C. A. SMITH.
PIPE BENDING MACHINE.
APPLICATION FILED MAR. 1, 1906.

2 SHEETS—SHEET 2.

Witnesses:

Inventors,
Howard A. Pedrick.
Charles A. Smith.
by their Attorneys,

UNITED STATES PATENT OFFICE.

HOWARD A. PEDRICK AND CHARLES A. SMITH, OF PHILADELPHIA, PENNSYLVANIA, ASSIGNORS TO SAID SMITH.

PIPE-BENDING MACHINE.

No. 842,111.      Specification of Letters Patent.      Patented Jan. 22, 1907.

Application filed March 1, 1906. Serial No. 303,650.

*To all whom it may concern:*

Be it known that we, HOWARD A. PEDRICK and CHARLES A. SMITH, citizens of the United States, residing in Philadelphia, Pennsylvania, have invented certain Improvements in Pipe-Bending Machines, of which the following is a specification.

The object of our invention is to provide a strong and powerful machine for bending pipes and other shapes, and one in which the character of the bend can be readily varied by change in the relation of the fixed bearing element of the machine to the moving element of the same.

Figure 1:
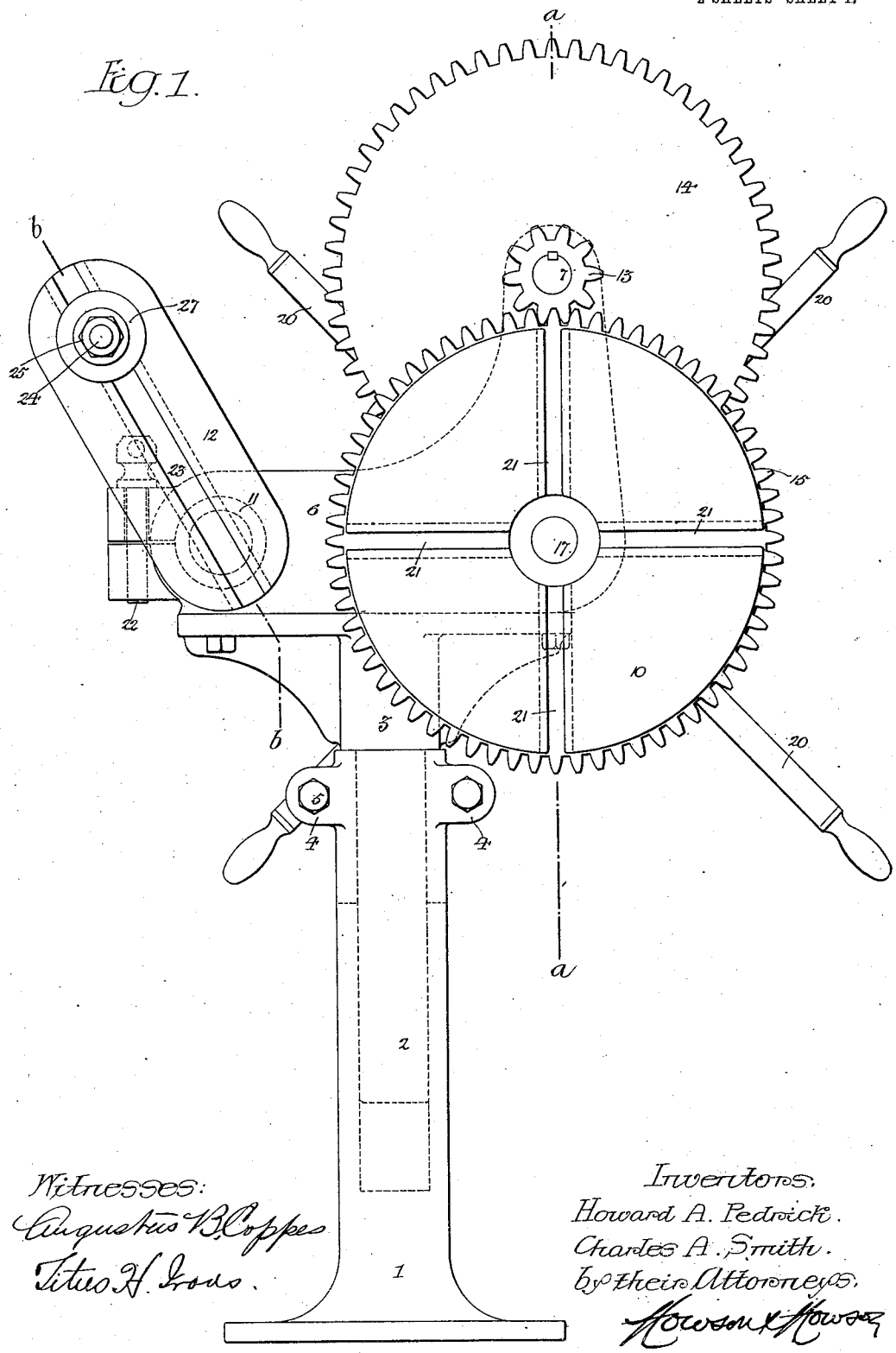
Figure 2:
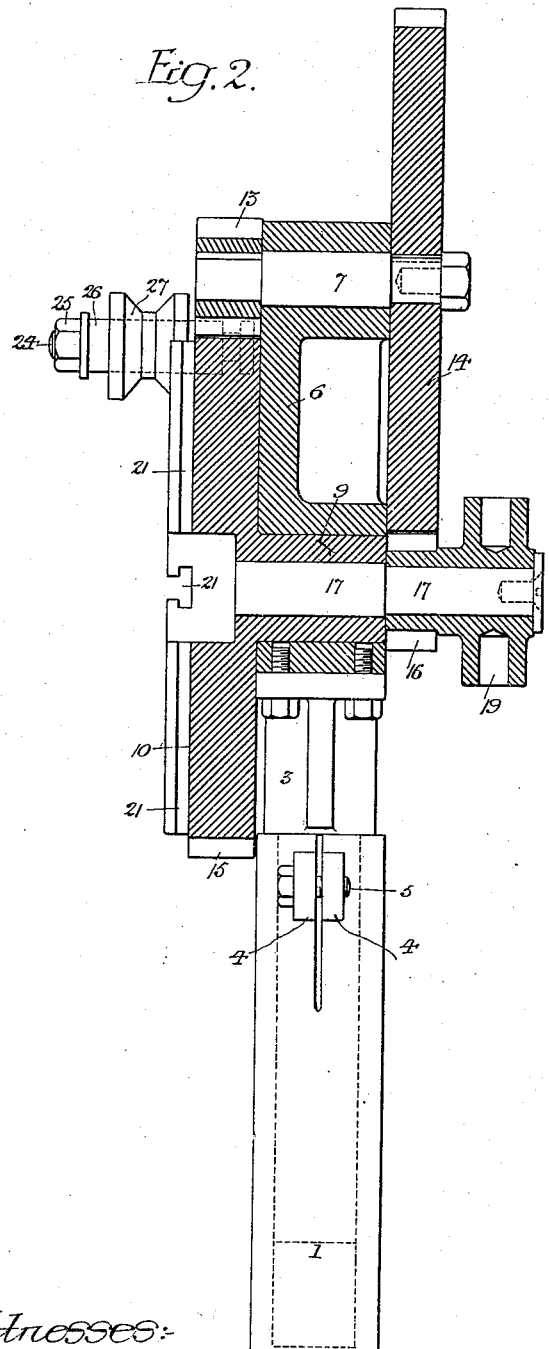
Figure 3:
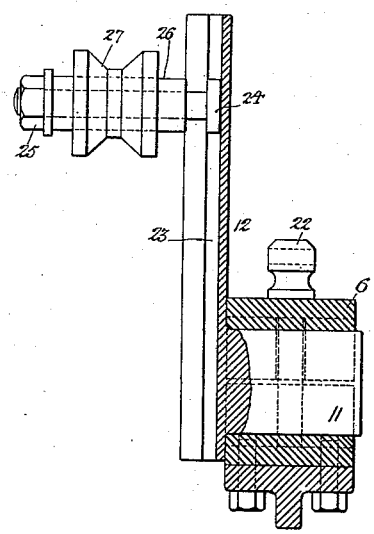

In the accompanying drawings, Figure 1 is a face view of a pipe-bending machine constructed in accordance with our invention. Fig. 2 is a transverse section on the line *a a*, Fig. 1; and Fig. 3 is a transverse section on the line *b b*, Fig. 1.

In the drawings, 1 represents a post or column intended to be rigidly bolted or otherwise secured to a floor or other support, this post or column being hollow for the reception of the central stem 2 of a head 3, which is thereby mounted so as to rotate about a vertical axis on the post 1, the upper end of said post being split and provided with clamping-ears 4 and bolts 5, whereby it can be caused to grip the stem 2, as desired, and thus secure the head 3 in any desired position of rotary adjustment on the post. Rigidly bolted upon the top of the head 3 is a frame 6, which has a bearing for a short shaft or spindle 7, another bearing for the hub 9 of a rotatable face-plate 10, and a third bearing for the hub 11 of an arm 12.

Secured to one end of the shaft 7 is a spur-pinion 13, and to its other end is secured a spur-wheel 14, the pinion 13 meshing with spur-teeth 15, formed on the periphery of the face-plate 10, while the spur-wheel 14 meshes with a pinion 16, which is free to turn on a stud 17, secured to and projecting rearwardly from the hub of the face-plate, the hub of said pinion 16 being provided with a capstan 19, which has sockets for the reception of projecting bars 20, whereby power may be applied to the pinion 16, and thence through the medium of the spur-wheel 14, shaft 7, pinion 13, and spur-teeth 15 to the rotatable face-plate 10. The said face-plate has undercut radial grooves 21 in order that a suitable clamping die or dies for the pipe can be readily secured to the face-plate in any desired position of adjustment thereon.

That portion of the frame 6 which receives the hub 11 of the arm 12 is split and provided with a clamping-bolt 22, whereby when said clamp is loosened the arm can be swung around the axis of the hub into any desired position of adjustment in respect to the face-plate 10 and can then be secured in such position of adjustment by tightening the clamp.

The arm 12 has an undercut longitudinal groove 23 for the reception of a T-headed bolt 24 with nut 25, whereby a stud 26 can be secured to the face of the arm 12 in any desired position of radial adjustment thereon, and on said stud 26 is rotatably mounted a roller or spool 27, which constitutes the fixed bearing for the pipe to be bent. When, therefore, the end portion of the pipe is secured to the clamping-die on the face-plate, the relation to said roller or spool in respect to the clamping-die will determine the character of the curve or bend imparted to the pipe, and such relation is susceptible of a variety of changes either by radial adjustment of the stud 26 on the arm 12 or by swinging movement of said arm on the frame 6.

We claim—

1. In a pipe-bending machine, the combination of a hollow post split at its upper end to form a clamp, a head having a stem rotatably mounted in the post, a face-plate and its operating gearing carried by the head, and means for causing the split portion of the post to clamp the stem, substantially as specified.

2. The combination, in a pipe-bending machine, of a face-plate having peripheral teeth thereon and a hub having a spindle projecting rearwardly therefrom, a pinion rotatably mounted on said spindle and having a capstan thereon, a shaft having a spur-wheel engaging said pinion and a pinion meshing with the spur-teeth of the face-plate, and bearings for said shaft and for the hub of the face-plate, substantially as specified.

3. The combination, in a pipe-bending machine, of a rotatable face-plate, a swinging arm having a bearing for the pipe which is to be bent, and a frame having a split portion constituting a clamping-bearing for the hub of said arm, substantially as specified.

In testimony whereof we have signed our names to this specification in the presence of two subscribing witnesses.

HOWARD A. PEDRICK.
CHAS. A. SMITH.

Witnesses:
GEO. MECKE,
EDMUND B. SEYMOUR.